(12) United States Patent
Raese

(10) Patent No.: US 6,700,853 B2
(45) Date of Patent: Mar. 2, 2004

(54) DATA STORAGE DEVICES WITH WAFER ALIGNMENT COMPENSATION

(75) Inventor: J. Craig Raese, Boise, ID (US)

(73) Assignee: Hewlett-Packard Development Company, LP., Houston, TX (US)

(*) Notice: Subject to any disclaimer, the term of this patent is extended or adjusted under 35 U.S.C. 154(b) by 319 days.

(21) Appl. No.: 09/910,530

(22) Filed: Jul. 20, 2001

(65) Prior Publication Data

US 2003/0016613 A1 Jan. 23, 2003

(51) Int. Cl.[7] .................................................. G11B 9/10
(52) U.S. Cl. ........................ 369/101; 369/126; 365/118; 365/128; 365/217
(58) Field of Search ................................ 369/101, 126, 369/100; 365/151, 118, 127, 128, 217

(56) References Cited

U.S. PATENT DOCUMENTS

| | | | |
|---|---|---|---|
| 5,557,596 A | * | 9/1996 | Gibson et al. ............... 369/101 |
| 6,590,850 B2 | * | 7/2003 | Eldredge et al. ............ 369/101 |
| 6,643,248 B2 | * | 11/2003 | Naberhuis et al. .......... 369/101 |

* cited by examiner

*Primary Examiner*—Doris H. To
*Assistant Examiner*—Jorge L Ortiz-Criado

(57) ABSTRACT

Methods for storing data are provided. Preferably, the method includes the steps of: providing a data storage device, and preventing an emitter associated with a first data cluster of the data storage device from writing data to another one of the data clusters. Data storage devices also are provided.

10 Claims, 8 Drawing Sheets

DATA STORAGE DEVICES WITH WAFER ALIGNMENT COMPENSATION

BACKGROUND OF THE INVENTION

1. Field of the Invention

The present invention relates to data storage devices and, in particular, to systems and methods utilizing atomic resolution storage techniques for storing data.

2. Background of the Invention

Recently developed semiconductor-based electron sources can be used in data storage devices, such as hard drives, optical drives, and dynamic random access memory (DRAM), for example. An example of such a data storage device is described in U.S. Pat. No. 5,557,596. The device described in that patent includes multiple electron emitters with electron emission surfaces that face a storage medium. During write operations, the electron sources bombard the storage medium with relatively high intensity electron beams. During read operations, the electron sources bombard the storage medium with relatively low intensity electron beams.

During fabrication of such a data storage device, multiple semi-conductor wafers are used. Typically, a first wafer includes one or more data clusters, which are defined by storage media, and a second wafer includes one or more emitters. The wafers are aligned and maintained in relative position with respect to each other, such as by bonding the wafers together. Due to various fabrication tolerances, however, one or more of the emitters of the second wafer may not be appropriately aligned with respect to corresponding storage areas of the first wafer. This misalignment could potentially result in an inability of the data storage device to properly write data to and/or read data from one or more of the storage areas. Therefore, there is a need for improved systems and methods that address these and/or other shortcomings of the prior art.

SUMMARY OF THE INVENTION

Briefly described, the present invention relates to systems and methods pertaining to atomic resolution storage techniques. In this regard, embodiments of the invention may be construed as providing data storage devices. A preferred embodiment includes a first wafer and a second wafer. The first wafer incorporates a storage medium that includes multiple data clusters. Each of the data clusters define storage areas, with each of the storage areas being configurable in one of a plurality of structural states to represent information stored in the storage area.

The second wafer is fixed in position relative to the first wafer and includes electron beam emitters that are configured to electrically communicate with the storage medium. The storage medium and the electron beam emitters are configured to move relative to each other so that at least one of the electron beam emitters is capable of providing a beam of electrons to storage areas of a first data cluster. So provided, the emitter can configure each of the storage areas of the first data cluster in one of the structural states. Additionally, a first cluster separation area is defined about the first data cluster. The first cluster separation area exhibits a width that, in some embodiments, is at least as wide as a manufacturing tolerance associated with fixing the position of the first wafer and the second wafer. So configured, if the first wafer and the second wafer are fixed in a position corresponding to a tolerance limit, the electron beam emitter is prevented from writing data to a data cluster other than the first data cluster.

Embodiments of the invention also may be construed as providing methods for storing data. In this regard, a preferred method includes the steps of: providing a data storage device, and preventing an emitter associated with a first data cluster of the data storage device from aligning with an adjacent data cluster.

Other embodiments of the invention may be construed as providing computer readable media for use with a data storage device. In this regard, a preferred embodiment includes logic configured to prevent an emitter associated with a first data cluster of a data storage device from attempting to write data to an adjacent data cluster.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION OF THE INVENTION

Figure 1:
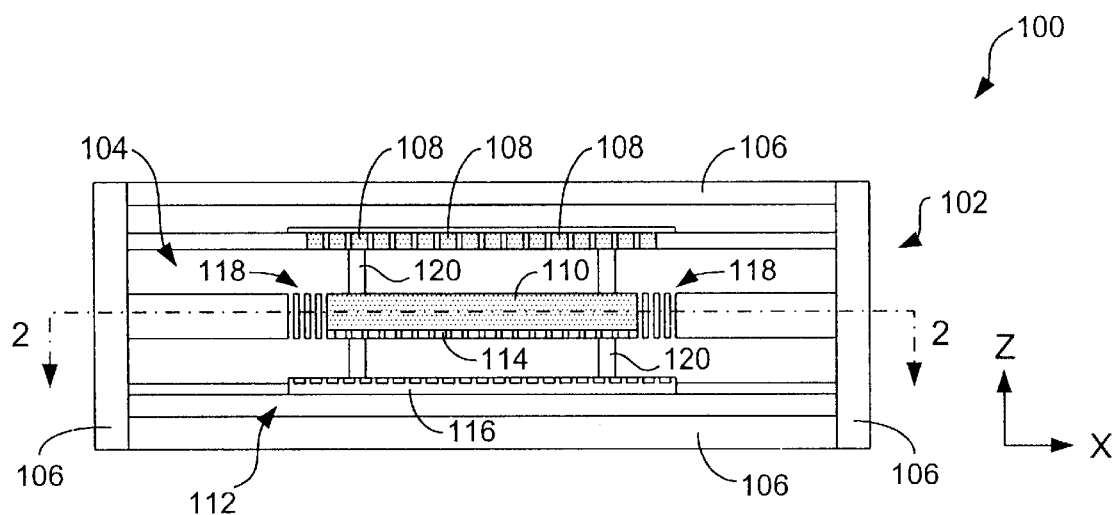
FIG. 1 is a schematic, side view of a representative data storage device.
Figure 2:
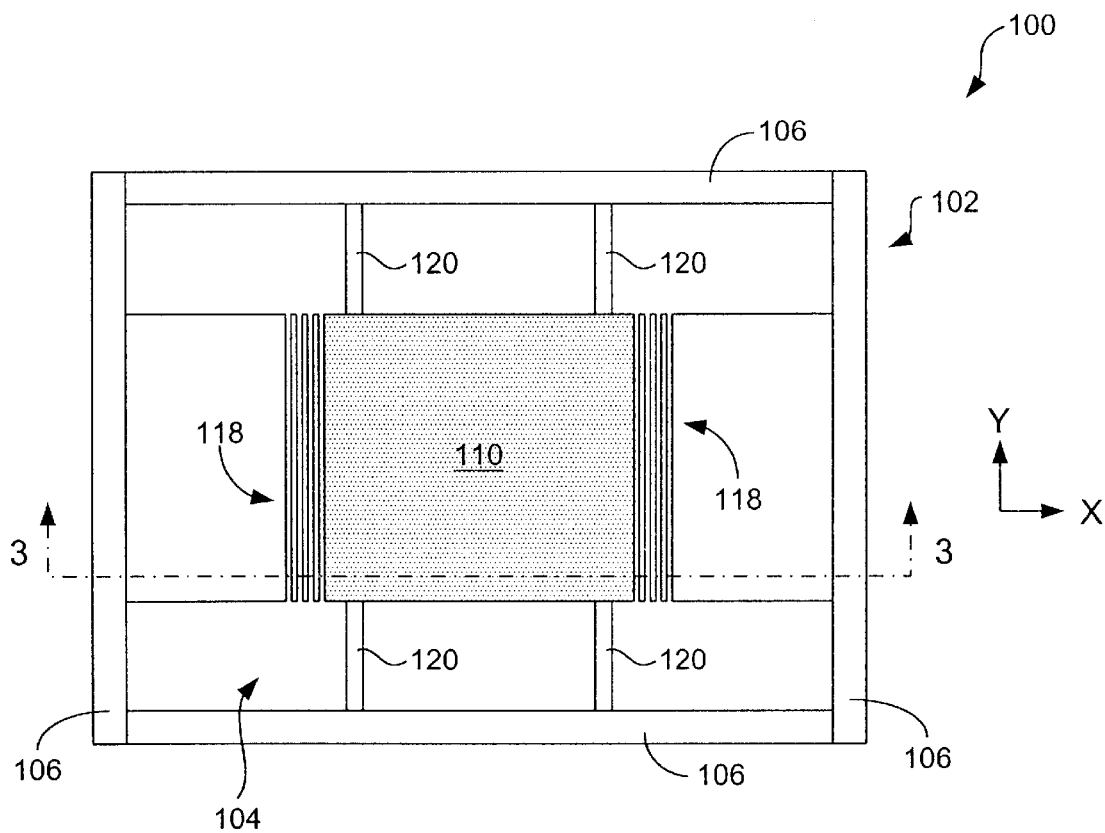
FIG. 2 is a schematic, cross-sectional view of the data storage device of FIG. 1 taken along line 2—2.
Figure 3:
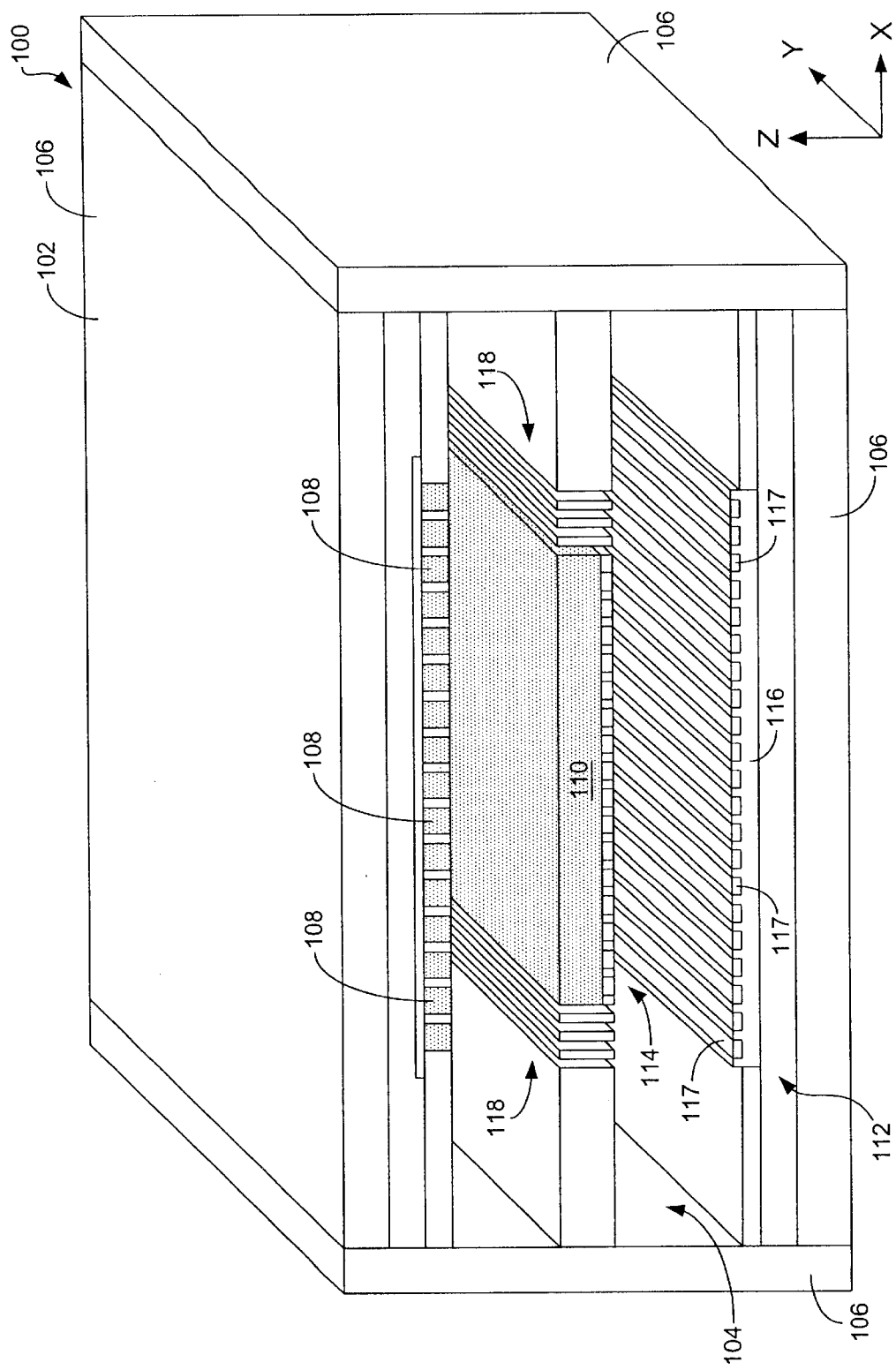
FIG. 3 is a schematic, cross-sectional view of the data storage device of FIGS. 1 and 2 taken along line 3—3.

Referring now in more detail to the drawings, in which like numerals indicate corresponding parts throughout the several views, FIGS. 1–3 illustrate a representative data storage device 100. It is noted that data storage device 100 is similar in construction to that described in U.S. Pat. No. 5,557,596, which is incorporated by reference herein.

As indicated in FIGS. 1–3, data storage device 100 generally includes an outer casing 102 that defines an interior space 104. By way of example, the casing 102 can include walls 106 that define the interior space. Typically, walls 106 are sealed to each other so that a vacuum can be maintained within the interior space. For instance, a vacuum of at least approximately 10-3 Torr is maintained within the interior space in some embodiments. Although a particular configuration is shown for the casing 102, it is to be understood that the casing can take many different forms that would be readily apparent to persons having ordinary skill in the art.

Within interior space 104 are electron emitters 108 that face a storage medium 110. These electron emitters can, for example, include field (i.e., tip) emitters, such as described in U.S. Pat. No. 5,557,596. Alternatively, the electron emitters 108 can include flat emitters, such as those described in U.S. Pat. No. 6,643,249 which is incorporated by reference herein. Various other emitters also can be used.

Figure 4:
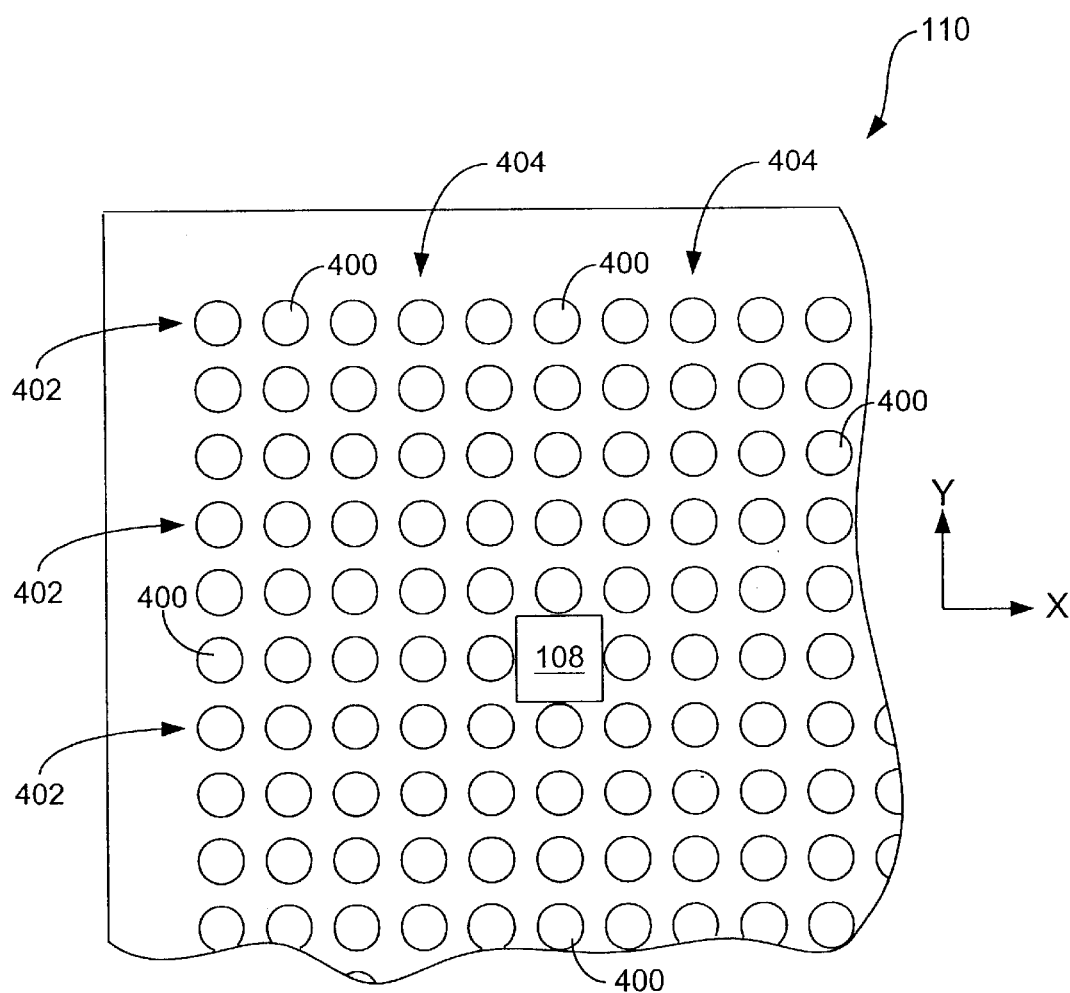
FIG. 4 is a partially cut-away, schematic view of a storage medium of the data storage device shown in FIGS. 1–3.

As described in relation to FIG. 4, storage medium 110 includes a plurality of storage areas (not visible in FIGS. 1–3). In a preferred embodiment, each storage area of the storage medium 110 is configured to store one or bits more of data. Electron emitters 108 are configured to emit electron beam currents toward the storage areas of storage medium 110 when a predetermined potential difference is applied to the electron emitters. Depending upon the distance between the emitters and the storage medium, the type of emitters, and the spot size (i.e., bit size) required, electron optics may be useful in focusing the electron beams. Voltage also can be applied to the storage medium to accelerate the emitted electrons to aid in focusing the emitted electrons.

Each electron emitter 108 can serve multiple storage areas of storage medium 110. To facilitate alignment between each electron emitter 108 and an associated storage area, the electron emitters and storage medium can be moved relative to each other, such as in the X and Y directions noted in FIG. 2. To provide for this relative movement, data storage device 100 can include a micromover 112 that scans the storage medium 110 with respect to the electron emitters 108. As indicated in FIGS. 1 and 3, micromover 112 can include a rotor 114 connected to the storage medium 110, a stator 116 that faces the rotor, and one or more springs 118 that are positioned to the sides of the storage medium. As is known in the art, displacement of the rotor 114, and thereby the storage medium 110, can be initiated by the application of appropriate potentials to electrodes 117 of the stator 116 so as to create a field that displaces the rotor 114 in a desired manner.

When micromover 112 is displaced, the micromover scans the storage medium 110 to different locations within the X-Y plane so that each emitter 108 can be positioned above a particular storage area. A preferred micromover 112 preferably has sufficient range and resolution to position the storage areas 110 under the electron emitters 108 with high accuracy. By way of example, the micromover 112 can be fabricated through semiconductor microfabrication processes. Although relative movement between electron emitters 108 and storage medium 110 has been described as being accomplished through displacement of the storage medium, it will be understood that such relative movement can alternatively be obtained by displacing the electron emitters or by displacing both the electron emitters and the storage medium. Moreover, although a particular micromover 112 is shown and described herein, it will be appreciated by persons having ordinary skill in the art that alternative moving means could be employed to obtain such relative movement.

Alignment of an emitted beam and storage area can be further facilitated with deflectors (not shown). By way of example, the electron beams can be rastered over the surface of storage medium 110 by either electrostatically or electromagnetically deflecting them, as through use of electrostatic and/or electromagnetic deflectors positioned adjacent the emitters 108. Many different approaches to deflect electron beams can be found in literature on scanning electron microscopy (SEM), for example.

Electron emitters 108 are responsible for reading and writing information on the storage areas of the storage medium with the electron beams they produce. Therefore, electron emitters 108 preferably produce electron beams that are narrow enough to achieve the desired bit density for the storage medium 110 and provide the different power densities needed for reading from and writing to the medium.

As indicated in FIGS. 1 and 2, data storage device 100 includes one or more supports 120 that support the storage medium 110 within the interior space 104. When provided, supports 120 typically are configured as thin-walled microfabricated beams that flex when storage medium 110 is displaced in the X and/or Y directions. It should be noted that various combinations of supports and/or springs can be used. As is further indicated in FIGS. 1 and 2, supports 120 each can be connected to the walls 106 of the casing 102 or, alternatively, to stator 116.

In a preferred embodiment, electron emitters 108 are contained within a two-dimensional array of emitters. By way of example, an array of 100×100 electron emitters 108 can be provided with an emitter pitch of approximately 5 to 100 micrometers in both the X and Y directions. As discussed above, each emitter 108 typically is used to access a plurality of storage areas of the storage medium 110. FIG. 4 schematically depicts a representative embodiment of this relationship. In particular, FIG. 4 illustrates a single electron emitter 108 positioned above a plurality of storage areas 400 of the storage medium 110.

As indicated in FIG. 4, the storage areas 400, like the electron emitters 108, are contained in a two-dimensional array. In particular, storage areas 400 are arranged in separate rows 402 and columns 404 on the surface of the storage medium 110. In a preferred embodiment, each emitter 108 is only responsible for a portion of the entire length of a predetermined numbers of rows 402. Accordingly, each emitter 108 normally can access a matrix of storage areas 400 of particular rows 402 and columns 404. However, since each data cluster typically is connected to a single external circuit, only one emitter of a data cluster is used at a time.

To address a storage area 400, micromover 112 is activated to displace storage medium 110 (and/or electron emitters 108) to align the storage area with a particular electron emitter. Typically, each emitter 108 can access tens of thousands to hundreds of millions of storage areas 400 in this manner. Storage medium 110 can have a periodicity of approximately 5 to 100 nanometers between any two storage areas 400, and the range of micromover 112 can be approximately 15 micrometers. As will be appreciated by persons having ordinary skill in the art, each of the electron emitters can be addressed simultaneously or in a multiplexed manner. A parallel-accessing scheme can be used to significantly increase the data rate of storage device 100.

Writing information to data storage device 100 is accomplished by temporarily increasing the power density of an electron beam produced by an electron emitter 108 to modify the surface state of a storage area 400 of storage medium 110. For instance, the modified state can represent a "1" bit, while the unmodified state can represent a "0" bit. Moreover, the storage areas can be modified to different degrees to represent more than two bit types, if desired. In a preferred embodiment, storage medium 110 is constructed of a material whose structural state can be changed from crystalline to amorphous by electron beams. Example materials are germanium telluride (GeTe) and ternary alloys based on GeTe. To change from the amorphous to the crystalline state, the beam power density can be increased and then slowly decreased. This increase/decrease heats the amorphous area and then slowly cools it so that the area has time to anneal into its crystalline state. To change from the crystalline to amorphous state, the beam power density is increased to a high level and then rapidly reduced. Although temporary modification of the storage medium 110 is described herein, it will be understood that permanent modification is possible where write-once-read-many (WORM) functionality is desired.

Reading is accomplished by observing the effect of the electron beam on storage area 400, or the effect of the storage area on the electron beam. During reading, the power density of the electron beam is kept low enough so that no further writing occurs. In a first reading approach, reading is accomplished by collecting the secondary and/or backscattered electrons when an electron beam with a relatively low (i.e., lower than that needed to write) power density is applied to storage medium 110. In that the amorphous state has a different secondary electron emission coefficient (SEEC) and backscattered electron coefficient (BEC) than the crystalline state, a different number of secondary and backscattered electrons are emitted from a storage area 400 when bombarded with a "read" electron beam. By measuring the number of secondary and backscattered electrons, the state of storage area 106 can be determined.

Figure 5:
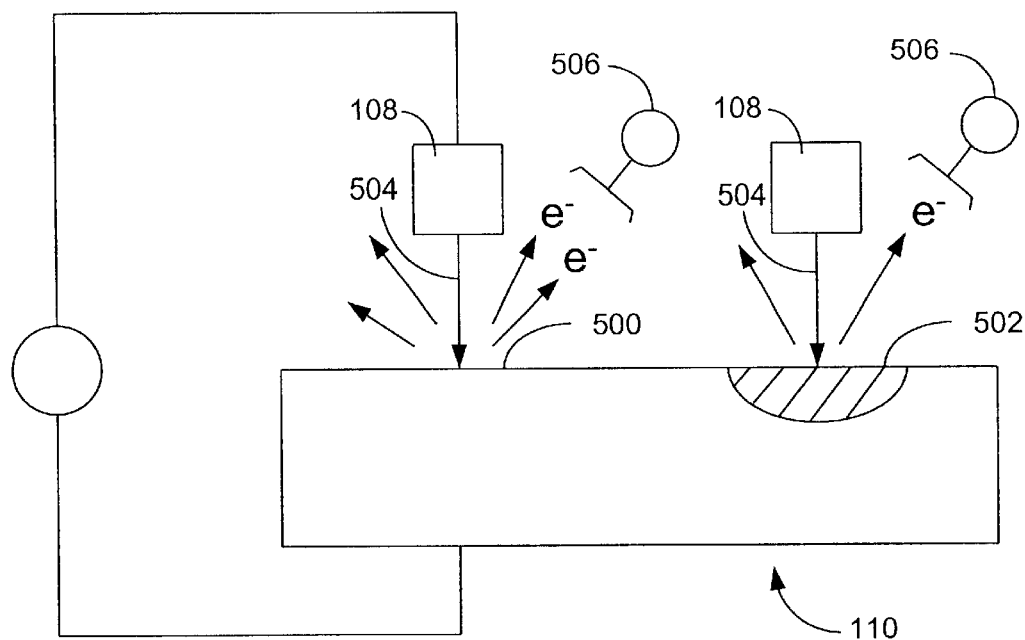
FIG. 5 is a schematic view of a representative reading/writing operation for the data storage device of FIGS. 1–4.

FIG. 5 illustrates a representative apparatus for reading in the manner described above. More particularly, FIG. 5 schematically illustrates electron emitters 108 reading from storage areas 500 and 502 of storage medium 110. In FIG. 5, the state of storage area 500 has not been modified, while the state of storage area 502 has been modified. When a beam 504 of electrons bombard the storage areas 500 and 502, both the secondary electrons and backscattered electrons are collected by electron collectors 506. As will be appreciated by persons having ordinary skill in the art, modified storage area 500 will produce a different number of secondary electrons and backscattered electrons as compared to unmodified storage area 502. The number may be greater or lesser depending upon the type of material and the type of modification made. By monitoring the magnitude of the signal current collected by the electron collectors 506, the state of and, in turn, the bit stored in the storage areas 500 and 502 can be identified.

Figure 6:
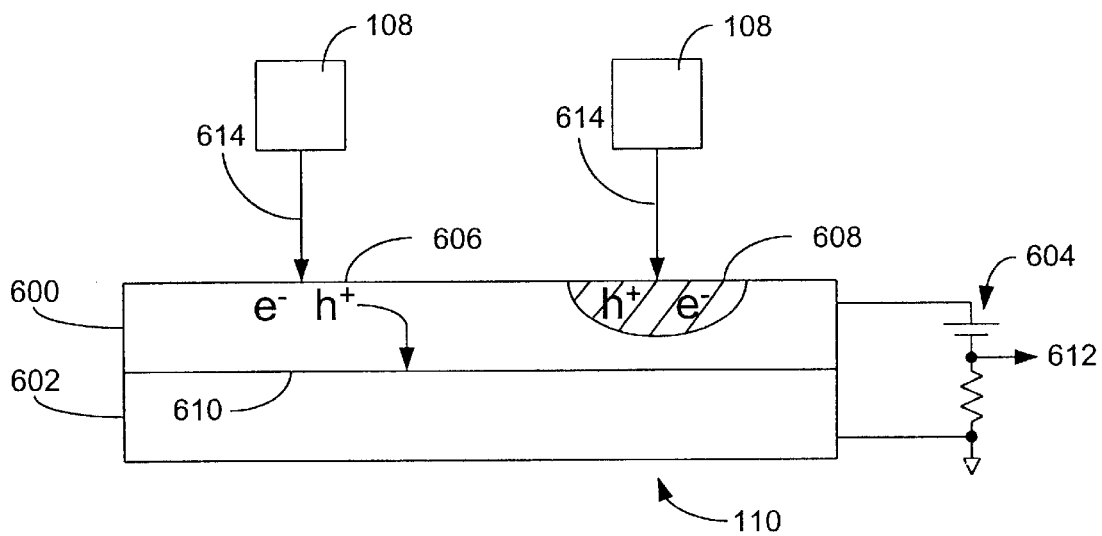
FIG. 6 is a schematic view of a representative reading/writing operation for the data storage device of FIGS. 1–4.

In another embodiment, a diode structure is used to determine the state of the storage areas 400. According to this approach, storage medium 110 is configured as a diode which can, for example, includes a p-n junction, a Schottky, barrier, or substantially any other type of electronic valve. FIG. 6 illustrates a representative example of such a storage medium 110. It will be understood that alternative diode arrangements (such as those shown in U.S. Pat. No. 5,557, 596) are feasible.

As indicated in this FIG. 6, storage medium 110 is arranged as a diode that includes two layers, e.g., layers 600 and 602. By way of example, one of the layers is p type and the other is n type. Storage medium 110 is connected to an external circuit 604 that reverse-biases the storage medium.

With this arrangement, bits are stored by locally modifying storage medium 110 in such a way that the collection efficiency for minority carriers generated by a modified region 608 is different than that of an unmodified region 606. The collection efficiency for minority carriers can be defined as the fraction of minority carriers generated by the instant electrons that are swept across a diode junction 610 of storage medium 110 when the medium is biased by the external circuit 604 to cause a signal current 612 to flow through the external circuit.

In use, electron emitters 108 emit narrow beams 614 of electrons onto the surface of the storage medium 110. These beams excite electron-hole pairs near the surface of the medium. Because storage medium 110 is reverse-biased by the external circuit 604, the minority carriers that are generated by the incident electrons are swept toward the diode junction 610. Electrons that reach the junction 610 are then swept across the junction. Accordingly, minority carriers that do not recombine with majority carriers before reaching the junction 610 are swept across the junction, causing a current flow in the external circuit 604.

As described above, writing is accomplished by increasing the power density of electron beams enough to locally alter the physical properties of storage medium 110. Where the medium 110 is configured as shown in FIG. 6, this alteration affects the number of minority carriers swept across the junction 610 when the same area is radiated with a lower power density "read" electron beam. For instance, the recombination rate in a written (i.e., modified) area 608 could be increased relative to an unwritten (i.e., unmodified) area 606 so that the minority carriers generated in the written area have an increased probability of recombining with minority carriers before they have a chance to reach and cross junction 610. Hence, a smaller current flows in external circuit 604 when the "read" electron beam is incident upon a written area 608 than when it is incident upon an unwritten area 606. Conversely, it is also possible to start with a diode structure having a high recombination rate and to write bits by locally reducing the recombination rate. The magnitude of the current resulting from the minority carriers depends upon the state of particular storage area, and the current continues the output signal 612 to indicate the bit stored.

Figure 7:
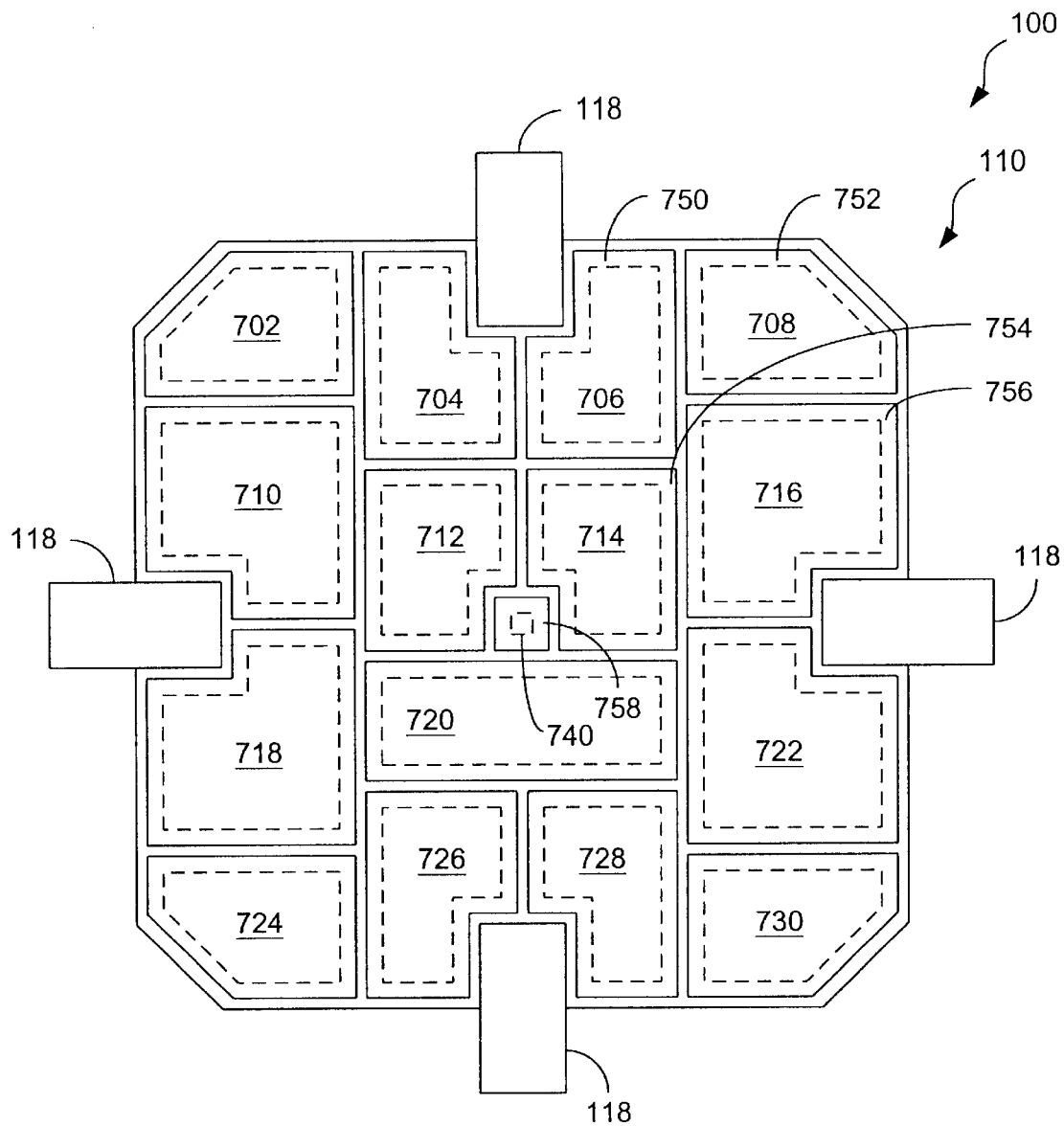
FIG. 7 is a schematic view of a storage medium of a representative data storage device.

Reference will now be made to FIG. 7, which schematically depicts a representative embodiment of a storage medium 110 of a data storage device 100. Flexures 118, such as springs, beams or other flexible support mechanisms, for example, extend from storage medium 110 and permit movement of the storage medium in some embodiments. As shown in FIG. 7, storage medium 110 includes multiple data clusters. In particular, fifteen (15) such data clusters, e.g., data clusters 702, 704, 706, 708, 710, 712, 714, 716, 718, 720, 722, 724, 728, and 730, are provided on storage medium 110. In other embodiments, however, various other numbers and configurations of data clusters can be provided. Each data cluster is capable of including multiple storage areas.

Each data cluster is associated with multiple electron emitters. For example, in some embodiments, over one hundred (100) emitters can be provided in each data cluster. Preferably, only one emitter associated with a particular data cluster is "on," e.g., either reading or writing data, at any given time. Additionally, an external circuit (not shown) is associated with each data cluster that facilitates transmission of data from the data cluster. For instance, each external circuit can include an amplifier, among other various components.

A servo cluster 740 is provided upon storage medium 110. Servo cluster 740 is configured to store data that is used for providing sensor feedback to a servo system (not shown). The servo system reads information from the servo cluster and uses the information to position the storage medium and/or emitters relative to the other.

Defined about each data cluster and the servo cluster preferably is a guard area formed of a writable portion of the storage medium, i.e., data can be written to the material of the guard area. By way of example, guard areas 750, 752, 754, 756, and 758 are defined about data clusters 706, 708, 714, 716, and servo cluster 758, respectively. Each of the aforementioned guard areas represents an area on the storage medium that is approximately at least equal in dimension to an expected manufacturing tolerance of the data storage device. In particular, it is presently contemplated that the storage medium of the data storage device will be provided on a first wafer and that emitters will be provided on a second wafer. The first and second wafers then will be bonded together. Since it also is contemplated that the wafers only can be bonded to each other within a given manufacturing tolerance, the guard areas are dimensioned so as to accommodate that tolerance. More specifically, even if the wafers are aligned (or mis-aligned) at the tolerance limit, which currently can be approximately ±5 μm, for example, an emitter should be positioned over an associated guard area and not over an adjacent data cluster or servo cluster. Thus, emitters to be associated with a particular data cluster should only be able to access, e.g., either read data from or write data to, that data cluster. This characteristic is demonstrated in the schematic diagram of FIG. 8.

Figure 8:
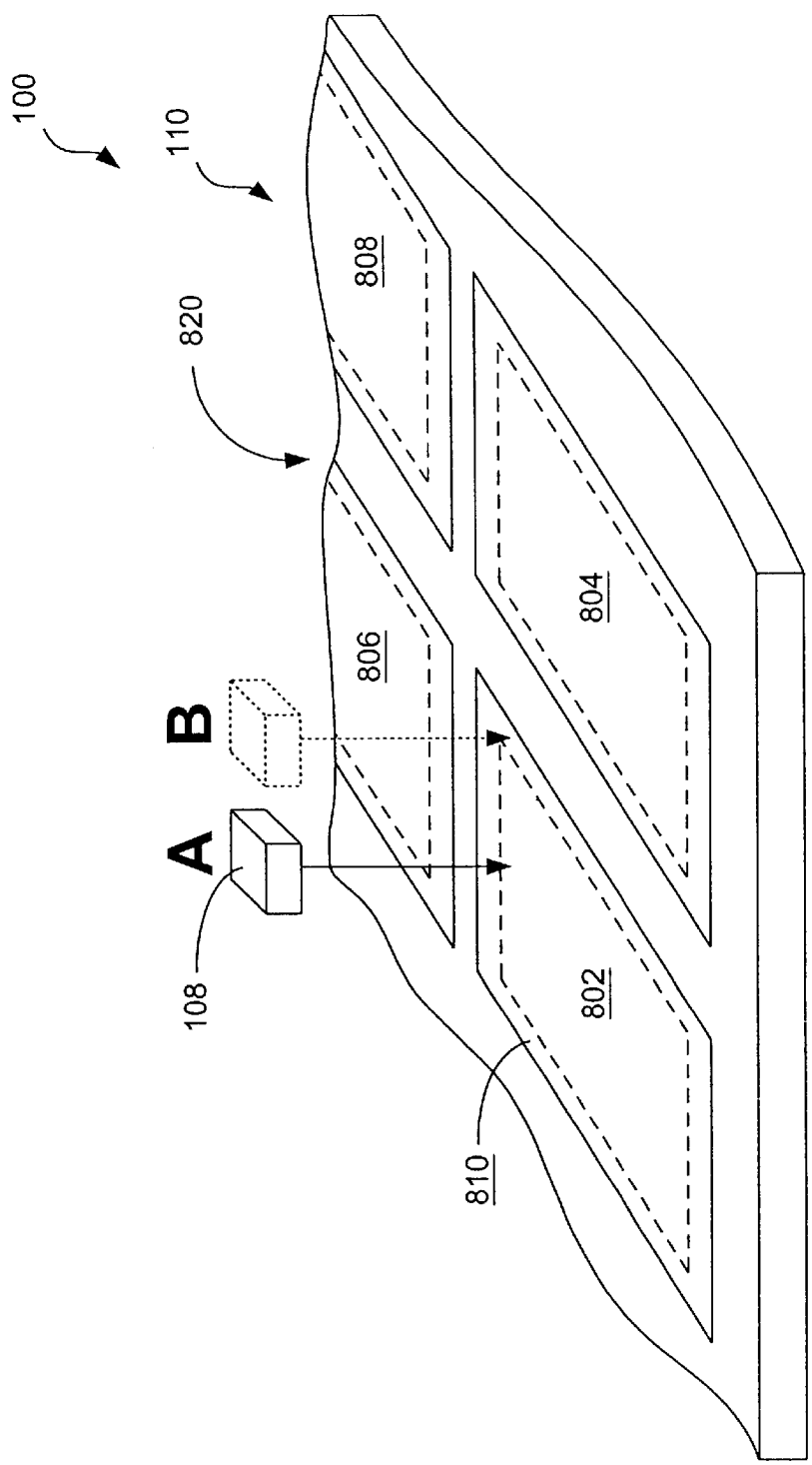
FIG. 8 is a partially cut-away, schematic view of the storage medium of FIG. 7 with a representative emitter shown in various positions relative to data clusters of the storage medium.

In FIG. 8, representative data clusters 802, 804, 806, and 808 are provided on a storage medium 110. A representative emitter 108 also is depicted in proximity to one of the data clusters. More specifically, it is intended that emitter 108 is to be associated with data cluster 802. Position A of the emitter corresponds to the desired orientation of that emitter when the wafers containing emitter 108 and storage medium 110 are precisely aligned. Position B of the emitter corresponds to the orientation presented when the aforementioned wafers are aligned at the tolerance limit. In position B, the emitter is aligned over the guard area 810 of data cluster 802.

Various other areas may be defined about a data cluster, with such other areas not being directly associated with an adjacent data cluster. For example, such an area may correspond to a media placement tolerance. More specifically, lithography techniques may only permit placement of data clusters with a quantifiable degree of accuracy. Thus, acceptable areas for data cluster placement should include a media placement tolerance area that will permit actual placement of a data cluster to occur at any location within the designated area. Therefore, a typical media placement tolerance area for a data cluster is defined as a discrete area about the periphery of the cluster.

Additionally, contact areas may be designated between adjacent data clusters to accommodate placement of electrical contacts and/or leads, for example. These electrical contacts and/or leads are adapted to provide electrical signals to and/or from storage areas of the data clusters. The contacts are provided at spaced intervals about the data clusters and will be described in detail hereinafter. The various areas provided about a data cluster, e.g., the guard area, media placement tolerance area, and contact area, are collectively referred to as a cluster separation area. A representative cluster separation area is designated 820 in FIG. 8.

In some embodiments, the data storage device is configured so that an emitter is not able to read data from or write data to an adjacent data cluster, e.g., a data cluster with which it is not associated. More specifically, in these embodiments, when the wafers of the data storage device are aligned at least within the established tolerance limits, an emitter should only be able to align with a portion of its corresponding data cluster or with its cluster separation area, e.g., any area not corresponding to an adjacent data cluster.

Figure 9:
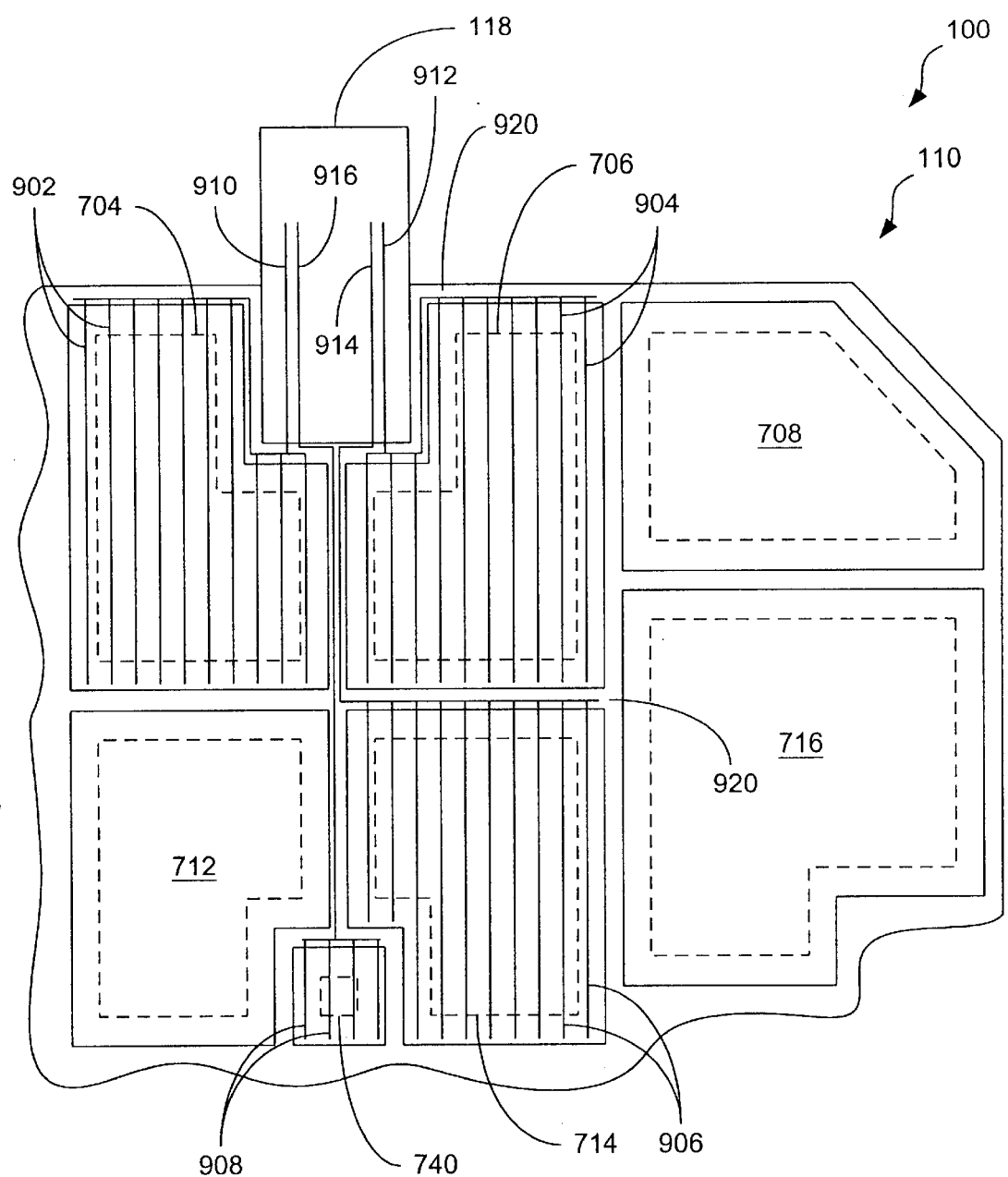
FIG. 9 is a partially cut-away, schematic view of the storage medium of FIGS. 7 and 8 showing detail of a representative contact layout.

Representative contact areas that are configured to accommodate placement of electrical contacts and/or leads are depicted in FIG. 9. As shown therein, contacts preferably are provided at spaced intervals across each data cluster. In particular, contacts 902 are associated with data cluster 704, contacts 904 are associated with data cluster 706, contacts 906 are associated with data cluster 714, and contacts 908 are associated with servo cluster 740. Each contact, in turn, electrically communicates with a corresponding lead. More specifically, contacts 902 electrically communicate with lead 910, contacts 904 electrically communicate with lead 912, contacts 906 electrically communicate with lead 914, and contacts 908 electrically communicate with lead 916. The leads can be adapted to provide electrical signals to and/or from storage areas of the corresponding data cluster. Contact areas 920 accommodate placement of at least some of the electrical contacts and/or leads.

Figure 10:
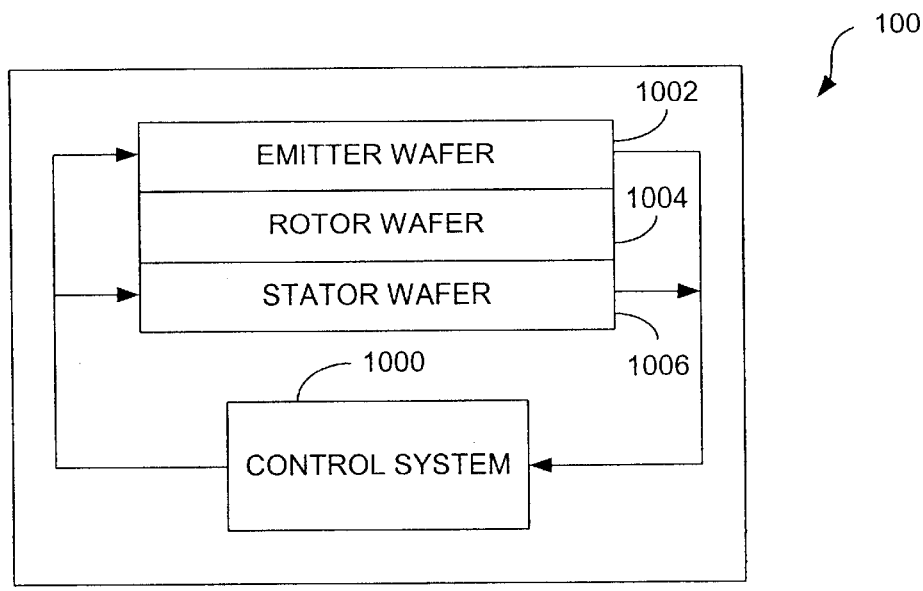
FIG. 10 is a schematic diagram of a representative data storage device showing detail of a preferred embodiment of the control system.

A preferred embodiment of data storage device 100 is depicted schematically in FIG. 10. In FIG. 10, data storage device 100 includes an emitter wafer 1002, a rotor wafer 1004, and stator wafer 1006. A control system 1000 also is provided that communicates with one or more of the wafers. Once the various wafers of the data storage device have been assembled, the control system may facilitate device calibration to appropriately account for the actual alignment of the emitters of the emitter wafer relative to the storage media of the rotor wafer.

Preferably, the control system is able to calibrate the data storage device so that an emitter does not attempt to write data to a location occupied by a contact or lead, for example. Such an attempt to write data to a location occupied by a contact or lead could cause the data to be unrecoverable. This is because the data intended to be written typically can not be written to a portion of the storage medium occupied by a contact or lead.

Control system 1000 can be implemented in software, firmware, hardware, or a combination thereof. When implemented in hardware, the control system can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

In an alternative embodiment, the control system 1000 is implemented in software as an executable program. The control system can be executed by a special or general purpose digital computer, such as a personal computer (PC; IBM-compatible, Apple-compatible, or otherwise), workstation, minicomputer, or mainframe computer. An example of a general purpose computer that can implement the control system is shown schematically in FIG. 11.

Generally, in terms of hardware architecture, computer 1100 includes a processor 1102, memory 1104, and one or more input and/or output (I/O) devices 1106 (or peripherals) that are communicatively coupled via a local interface 1108. Local interface 1108 can be, for example, one or more buses or other wired or wireless connections, as is known in the art. Local interface 1108 can include additional elements, which are omitted for ease of description. These additional elements can be controllers, buffers (caches), drivers, repeaters, and/or receivers, for example. Further, the local interface may include address, control, and/or data connections to enable appropriate communications among the components of computer 1100.

Processor 1102 is a hardware device configured to execute software that can be stored in memory 1104. Processor 1102 can be any custom made or commercially available processor, a central processing unit (CPU) or an auxiliary processor among several processors associated with the computer 1100. Additionally, the processor can be a semiconductor-based microprocessor (in the form of a microchip) or a macroprocessor. Examples of representative commercially available microprocessors are as follows: a PA-RISC series microprocessor from Hewlett-Packard Company, U.S.A., an 80×86 or Pentium series microprocessor from Intel Corporation, U.S.A., a PowerPC microprocessor from IBM, U.S.A., a Sparc microprocessor from Sun Microsystems, Inc, or a 68control series microprocessor from Motorola Corporation, U.S.A.

Memory 1104 can include any combination of volatile memory elements (e.g., random access memory (RAM, such as DRAM, SRAM, etc.)) and/or nonvolatile memory elements (e.g., ROM, hard drive, tape, CDROM, etc.). Moreover, memory 1104 can incorporate electronic, magnetic, optical, and/or other types of storage media. Note that memory 1104 can have a distributed architecture, where various components are situated remote from one another, but can be accessed by processor 1102.

Figure 11:
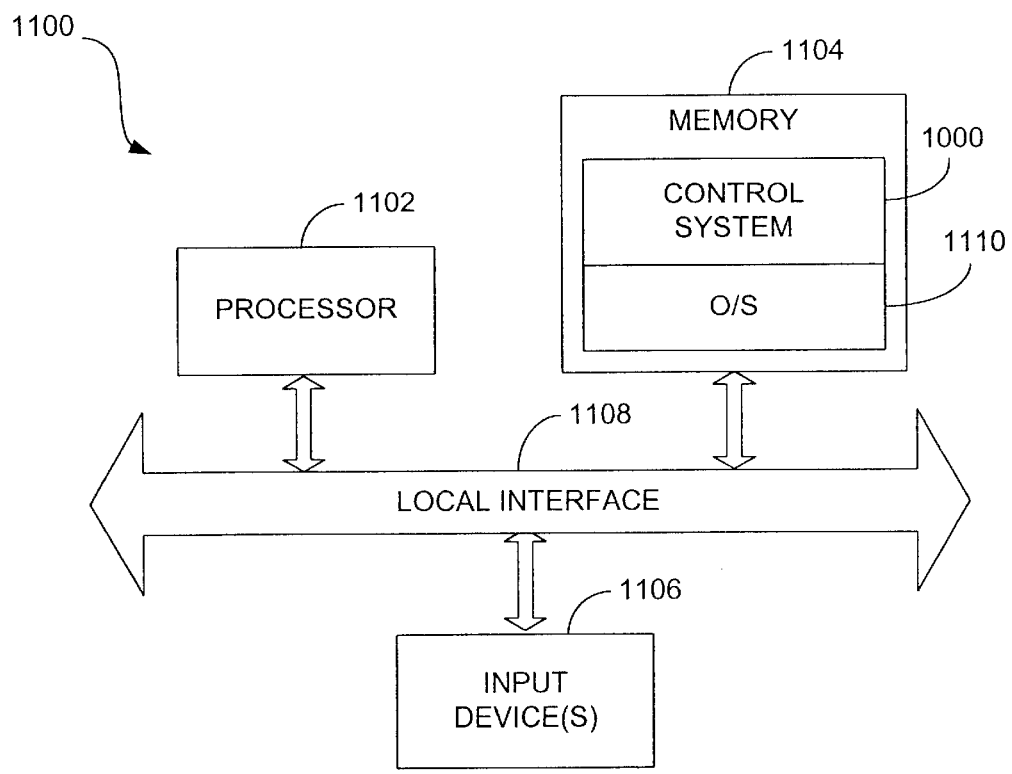
FIG. 11 is a schematic diagram of a representative computer or processor-based system that may utilize the control system of FIG. 10.

The software in memory 1104 can include one or more separate programs, each of which comprises an ordered listing of executable instructions for implementing logical functions. In the example of FIG. 11, the software in the memory 1104 includes the control system 1000 and a suitable operating system (O/S) 1110. A nonexhaustive list of examples of commercially available operating systems 1110 is as follows: a Windows operating system from Microsoft Corporation, U.S.A., a Netware operating system available from Novell, Inc., U.S.A., or a UNIX operating system, which is available for purchase from many vendors, such as Hewlett-Packard Company, U.S.A., Sun Microsystems, Inc., and AT&T Corporation, U.S.A. The operating system 1110 controls the execution of other computer programs, such as the control system 1000. Operating system 1110 also provides scheduling, input-output control, file and data management, memory management, and communication control and related services.

The I/O device(s) 1106 can include input devices such as a keyboard, for example. I/O device(s) 1106 also can include output devices such as a display, for example. I/O device(s) 1106 may further include devices that are configured to communicate both inputs and outputs such as a modulator/demodulator, for example.

When the computer 1100 is in operation, processor 1102 is configured to execute software stored within the memory 1104, communicate data to and from the memory 1104, and generally control operations of the computer 1100. The control system 1000 and the O/S 1110, in whole or in part, are read by the processor 1102, perhaps buffered within processor 1102, and then executed.

When control system 1000 is implemented in software, it should be noted that the control system can be stored on any computer readable medium for use by or in connection with any computer-related system or method. In the context of this document, a computer-readable medium is an electronic, magnetic, optical, or other physical device or means that can contain or store a computer program for use by or in connection with a computer-related system or method. Control system 1000 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Once calibrated by the control system, the data storage device may be able to operate so that an emitter does not attempt to write data to a location occupied by a contact or lead, for example. An attempt to write data to such a location could lead to the data being unrecoverable since the data would not be written to the intended storage medium.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A data storage device comprising:
    a first wafer having a storage medium, said storage medium having data clusters, each of said data clusters having storage areas associated therewith, each of said storage areas being configurable in one of a plurality of structural states to represent information stored in said storage area;
    a second wafer fixed in position relative to said first wafer, said second wafer having electron beam emitters configured to electrically communicate with said storage medium, said storage medium and said electron beam emitters being configured to move relative to each other such that at least one of said electron beam emitters is capable of providing a beam of electrons to storage areas of a first data cluster for configuring each of said storage areas of said first data cluster in one of said structural states; and a first cluster separation area defined about said first data cluster and forming a separation between said first data cluster and adjacent ones of said data clusters such that said at least one of said electron beam emitters is prevented from writing data to one of said data clusters other than said first data cluster.

2. The data storage device of claim 1, wherein said first cluster separation area has a width associated with a manufacturing tolerance, said manufacturing tolerance being associated with fixing the position of said first wafer and said second wafer.

3. The data storage device of claim 2, wherein, when said first wafer and said second wafer are fixed in a position corresponding to said tolerance limit of said manufacturing tolerance, said at least one of said electron beam emitters is aligned with said first cluster separation area.

4. The data storage device of claim 3, wherein said tolerance limit is ±5 $\mu$m, and wherein said first guard area has a width of approximately 5 $\mu$m.

5. The data storage device of claim 1, wherein said first cluster separation area includes a first guard area, said first guard area being formed on a writable portion of said storage medium such that said at least one of said electron beam emitters associated with said first data cluster can write data to at least a portion of said first guard area.

6. The data storage device of claim 1, further comprising:
leads electrically communicating with said data clusters, and wherein said first cluster separation area includes a contact area, said contact area being configured to accommodate placement of said leads therein such that said leads are arranged between adjacent ones of said data clusters.

7. The data storage device of claim 6, further comprising:
contacts electrically communicating with said data clusters, said contacts being arranged in groups of contacts, each of said groups being associated with a particular one of said data clusters, each of said groups electrically communicating with one of said leads such that said contacts facilitate electrical communication between said leads and said storage areas of said data clusters.

8. The data storage device of claim 7, further comprising:
a control system electrically communicating with said at least one of said electron beam emitters, said control system being configured to calibrate said at least one of said electron beam emitters such that said at least one of said electron beam emitters is configured not to attempt to write data on a portion of said storage medium occupied by at least one of said contacts.

9. A method for storing data, said method comprising:
providing a data storage device having a first wafer and a second wafer, the first wafer having a storage medium, the storage medium having data clusters, each of the data clusters having storage areas associated therewith, each of the storage areas being configurable in one of a plurality of structural states to represent information stored in the storage area, the second wafer being fixed in position relative to the first wafer, the second wafer having electron beam emitters configured to electrically communicate with the storage medium, the storage medium and the electron beam emitters being configured to move relative to each other such that at least one of the electron beam emitters is capable of providing a beam of electrons to a storage area of a first data cluster of the data clusters for configuring the storage area in one of the structural states; and preventing the at least one of the electron beam emitters associated with the first data cluster from writing data to another one of the data clusters; wherein the step of preventing comprises:
providing a first cluster separation area about the first data cluster, the first cluster separation area forming a separation between the first data cluster and data clusters arranged adjacent to the first data cluster.

10. A method for storing data, said method comprising:
providing a data storage device having a first wafer and a second wafer, the first wafer having a storage medium, the storage medium having data clusters, each of the data clusters having storage areas associated therewith, each of the storage areas being configurable in one of a plurality of structural states to represent information stored in the storage area, the second wafer being fixed in position relative to the first wafer, the second wafer having electron beam emitters configured to electrically communicate with the storage medium, the storage medium and the electron beam emitters being configured to move relative to each other such that at least one of the electron beam emitters is capable of providing a beam of electrons to a storage area of a first data cluster of the data clusters for configuring the storage area in one of the structural states;

preventing the at least one of the electron beam emitters associated with the first data cluster from writing data to another one of the data clusters; and accommodating a manufacturing tolerance associated with fixing the position of the first wafer and the second wafer;

wherein accommodating a manufacturing tolerance comprises:
providing a first guard area about the first data cluster, the first guard area being formed on a writable portion of the storage medium such that the at least one of the electron beam emitters associated with the first data cluster can write data to at least a portion of the first guard area.

* * * * *